(12) United States Patent
Mengel et al.

(10) Patent No.: US 10,968,144 B2
(45) Date of Patent: Apr. 6, 2021

(54) SYSTEMS AND METHODS FOR PRODUCING POTASSIUM SULFATE

(71) Applicant: Marsulex Environmental Technologies Corporation, Lebanon, PA (US)

(72) Inventors: Michael L. Mengel, Fredericksburg, PA (US); Michael T. Hammer, Birdsboro, PA (US); Barry W. Stolzman, Nazareth, PA (US)

(73) Assignee: Marsulex Environmental Technologies Corporation, Lebanon, PA (US)

( * ) Notice: Subject to any disclaimer, the term of this patent is extended or adjusted under 35 U.S.C. 154(b) by 0 days.

(21) Appl. No.: 16/595,760

(22) Filed: Oct. 8, 2019

(65) Prior Publication Data
US 2020/0109090 A1 Apr. 9, 2020

Related U.S. Application Data

(60) Provisional application No. 62/742,553, filed on Oct. 8, 2018.

(51) Int. Cl.
| | | |
|---|---|---|
| *C05D 1/02* | (2006.01) | |
| *B01D 9/00* | (2006.01) | |
| *C01D 5/00* | (2006.01) | |
| *B01J 14/00* | (2006.01) | |
| *C01G 21/14* | (2006.01) | |
| *C22B 3/00* | (2006.01) | |

(52) U.S. Cl.
CPC ............. *C05D 1/02* (2013.01); *B01D 9/0018* (2013.01); *B01J 14/00* (2013.01); *C01D 5/00* (2013.01); *C01G 21/14* (2013.01); *C22B 13/045* (2013.01); *B01D 2009/0086* (2013.01)

(58) Field of Classification Search
CPC ........ C22B 13/045; C01G 21/14; C05D 1/02; C05D 5/00; C05D 5/06; B01J 14/00; H01M 10/54; H01M 6/52; A62D 3/36; A62D 2101/43
See application file for complete search history.

(56) References Cited

U.S. PATENT DOCUMENTS

| | | |
|---|---|---|
| 715,214 A | 12/1902 | Ramage |
| 1,898,405 A | 2/1933 | Svendsen |
| (Continued) | | |

FOREIGN PATENT DOCUMENTS

| | | | |
|---|---|---|---|
| CN | 1830804 | 9/2006 | |
| CN | 101636512 A | * 1/2010 | ............. C01G 21/02 |
| (Continued) | | | |

OTHER PUBLICATIONS

International Search Report and Written Opinion for International Application No. PCT/US2019/055128, dated Feb. 5, 2020 (10 pages).

*Primary Examiner* — Timothy C Vanoy
(74) *Attorney, Agent, or Firm* — Hartman Global IP Law; Gary M. Hartman; Domenica N. S. Hartman

(57) ABSTRACT

Systems and methods for producing potassium sulfate. Such a method involves providing an industrial waste material that includes at least one metal sulfate or a metal product that has been reacted with sulfuric acid to produce metal sulfates, and then reacting the metal sulfate with potassium carbonate to produce a byproduct that contains potassium sulfate.

8 Claims, 2 Drawing Sheets

(56) References Cited

U.S. PATENT DOCUMENTS

| | | | |
|---|---|---|---|
| 2,152,242 | A | 3/1939 | Curtin |
| 2,187,749 | A | 1/1940 | Marvin |
| 3,689,253 | A | 9/1972 | Dorenfeld et al. |
| 3,883,348 | A | 5/1975 | Acoveno et al. |
| 4,229,271 | A | 10/1980 | Prengaman et al. |
| 4,269,810 | A | 5/1981 | Kolakowski |
| 5,788,739 | A | 8/1998 | Margulis |
| 5,827,347 | A | 10/1998 | Margulis |
| 6,177,056 | B1 | 1/2001 | Prengaman et al. |
| 6,403,045 | B1 * | 6/2002 | Daviller .................. A62D 3/33 423/209 |
| 7,998,440 | B2 * | 8/2011 | Martini .................. C22B 3/165 423/92 |
| 8,147,780 | B2 * | 4/2012 | Martini .................. C01G 21/14 423/92 |
| 2007/0028720 | A1 | 2/2007 | Sommariva et al. |
| 2016/0308261 | A1 | 10/2016 | Tyagi et al. |

FOREIGN PATENT DOCUMENTS

| | | | |
|---|---|---|---|
| CN | 105110352 | 12/2015 | |
| CN | 107779603 | 3/2018 | |
| WO | WO 2008087684 A1 * | 7/2008 | ............ C22B 7/007 |
| WO | 201811517 | 6/2018 | |

* cited by examiner

SYSTEMS AND METHODS FOR PRODUCING POTASSIUM SULFATE

CROSS-REFERENCE TO RELATED APPLICATIONS

This application claims the benefit of U.S. Provisional Application No. 62/742,553, filed Oct. 8, 2018, the contents of which are incorporated herein by reference.

BACKGROUND OF THE INVENTION

The present invention generally relates to production of potassium sulfate. The invention particularly relates to systems and processes for converting industrial waste into agricultural grade potassium sulfate fertilizer.

Potassium (K)-containing fertilizer is commonly added to improve the yield and quality of agricultural plants growing in soils that are lacking an adequate supply of this essential nutrient. Most K-containing fertilizers come from natural salt deposits located throughout the world. The word "potash" is a general term that most frequently refers to potassium chloride (KCl), but it can also apply to other K-containing fertilizers, such as potassium sulfate ($K_2SO_4$, commonly referred to as sulfate of potash, or SOP).

Potassium is a relatively abundant element in the Earth's crust, and production of potash fertilizer occurs in every inhabited continent. However, $K_2SO_4$ is rarely found in a pure form in nature. Instead it is naturally mixed with salts containing magnesium, sodium, and chloride (Mg, Na and Cl, respectively). Various processes have been used to produce $K_2SO_4$. For example, natural K-containing minerals (e.g., kainite, schoenite, leonite, langbeinite, glaserite, polyhalite, etc.) are mined and carefully rinsed with water and salt solutions to remove byproducts and produce $K_2SO_4$. Other industrial processes that have been proposed for producing $K_2SO_4$ from sources other than mined minerals are often commercially impractical due to the high cost of input materials.

In view of the above, it can be appreciated that it would be desirable if systems and methods were available for producing potassium sulfate that were capable of at least partly overcoming or avoiding the shortcomings or disadvantages noted above.

BRIEF DESCRIPTION OF THE INVENTION

The present invention provides systems and methods for producing potassium sulfate, preferably using industrial waste.

According to one aspect of the invention, a method is provided for producing potassium sulfate that includes providing an industrial waste material that includes at least one metal sulfate or a metal product that has been reacted with sulfuric acid to produce metal sulfates, and then reacting the metal sulfate with potassium carbonate to produce a byproduct comprising potassium sulfate.

According to another aspect of the invention, a system is provided that is configured to perform a method, such as that described above. Such a system includes a reaction tank adapted to react a metal sulfate with potassium carbonate to produce potassium sulfate, a filter unit for separating a metal carbonate byproduct from the potassium sulfate to yield an aqueous potassium sulfate liquor, a crystallizer system adapted to remove water from the aqueous potassium sulfate liquor and form a slurry containing potassium sulfate crystals, and one or more units for condensing and drying the potassium sulfate crystals to yield a potassium sulfate product.

Technical effects of methods and systems as described above preferably include the capability of efficiently producing potassium sulfate, potentially at a reduced cost relative to conventional methods that produce potassium sulfates from mined minerals.

Other aspects and advantages of this invention will be further appreciated from the following detailed description.

DETAILED DESCRIPTION OF THE INVENTION

Figure 1A:
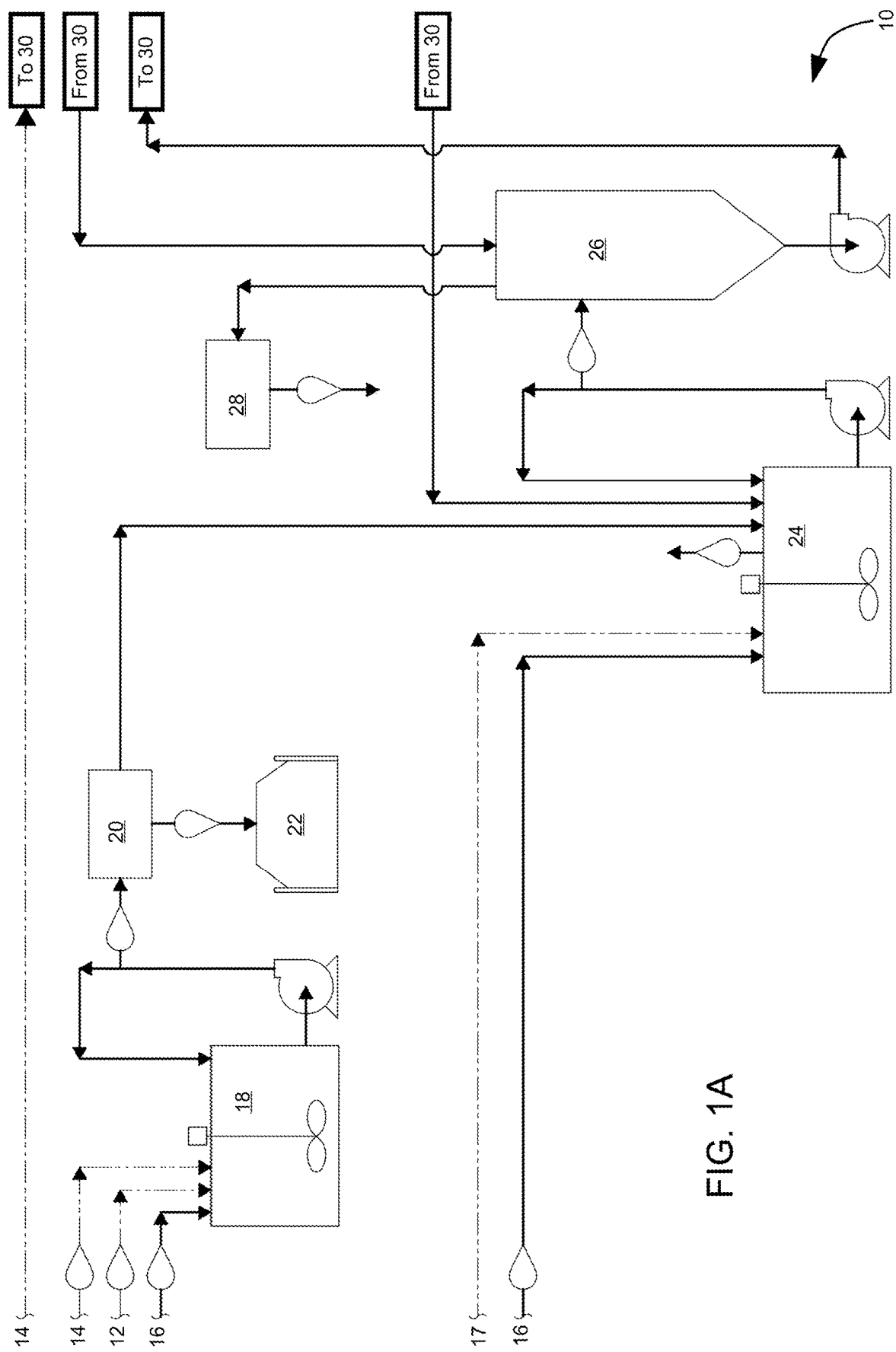
FIGS. 1A and 1B schematically represent portions of a system for producing potassium sulfate in accordance with a nonlimiting embodiment of this invention.

The present disclosure relates to systems and processes for producing agricultural grade potassium sulfate ($K_2SO_4$) for use in fertilizers. In general, the processes are achieved through conversion of metal sulfates to potassium sulfate via neutralization with potassium carbonate. Such processes may ordinarily be considered to be commercially impractical due to the cost of input materials (e.g., metal sulfates, electrolyte, etc.). In order to overcome these commercial barriers, the systems disclosed herein are adapted to convert various types of common industrial waste that contain metal sulfates (for example, as a constituent and possibly an impurity) into a potassium sulfate product.

Systems and processes disclosed herein for producing agricultural grade potassium sulfate can be applied to various industrial sources of sulfur, including but not limited to metal refinery waste processing, mine drainage, ore processing, copper refining, and secondary lead recovery operations, among others. These systems and processes provide industrial facilities with means by which industrial wastes can be eliminated or reduced, while simultaneously providing an economic benefit and a more environmentally friendly solution for handling and disposing of waste materials.

Conventionally, various industrial wastes, as nonlimiting examples, metal products (e.g., metal sulfates) and sulfuric acid produced by the above-noted industries, have been neutralized with processes that utilize an alkali, historically a sodium compound (e.g., sodium carbonate or soda ash) as a reagent for the neutralization process. For example, metal (M) products have been neutralized in accordance with the following equations.

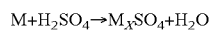

$$M + H_2SO_4 \rightarrow M_XSO_4 + H_2O$$

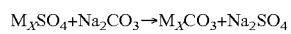

$$M_XSO_4 + Na_2CO_3 \rightarrow M_XCO_3 + Na_2SO_4$$

The resulting product may be a liquid waste stream that needs to be disposed of, which may not only be a challenging practice but also financially costly. In addition, governments are increasingly focused on discharge regulations and mandated effluent guidelines. As a result of stricter water rules, including minimizing total dissolved solids (TDS) from effluent streams and achieving zero liquid discharge (ZLD), industries have adopted post treatment processes, such as crystallization and disposal as a hazardous waste, which are costly and provide little to no economic recovery. For example, crystallized sodium sulfate is generally disposed of in landfills.

The present processes use potassium carbonate ($K_2CO_3$) as a reagent to neutralize industrial wastes, resulting in a potassium sulfate product. Unlike many other industrial products resulting from waste neutralization processes, potassium sulfate is a valuable byproduct that may be sold, for example, to the agriculture industry, thereby reducing the amount of unused product and potentially generating an additional revenue stream for various industrial facilities.

By reducing the amount of unused byproducts, these processes may enable various industrial processes to be more environmentally responsible with regards to air emissions limits, effluent limits, and waste disposal practices by offering alternative solutions for waste treatment and disposal issues, and reduce or even eliminate waste streams. Thus, the processes disclosed herein have the potential to generate a more balanced and resourceful cycle of sustainability through consumption, production, and repurposing.

In general, processes disclosed herein replace conventionally used sodium carbonate with potassium carbonate. For example, a process may include mixing a metal sulfate and potassium carbonate or mixing a metal product, sulfuric acid, and potassium carbonate in a reaction vessel. The products of the reaction are predominantly potassium sulfate in a liquid form and neutralized metal carbonates. The resultant slurry may be processed through a separation/filtration process where the metal carbonates are removed to produce a filtered liquor. The filtered liquor may be sold as a liquid or further refined into a solid material utilizing a crystallization process. The metal carbonate can be further processed in a reclamation process to extract the metal therefrom.

As a nonlimiting example, a metal (M) product may be at least partially neutralized in accordance with the following equations.

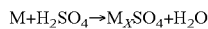

$$M + H_2SO_4 \rightarrow M_XSO_4 + H_2O$$

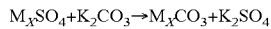

$$M_XSO_4 + K_2CO_3 \rightarrow M_XCO_3 + K_2SO_4$$

Figure 1B:
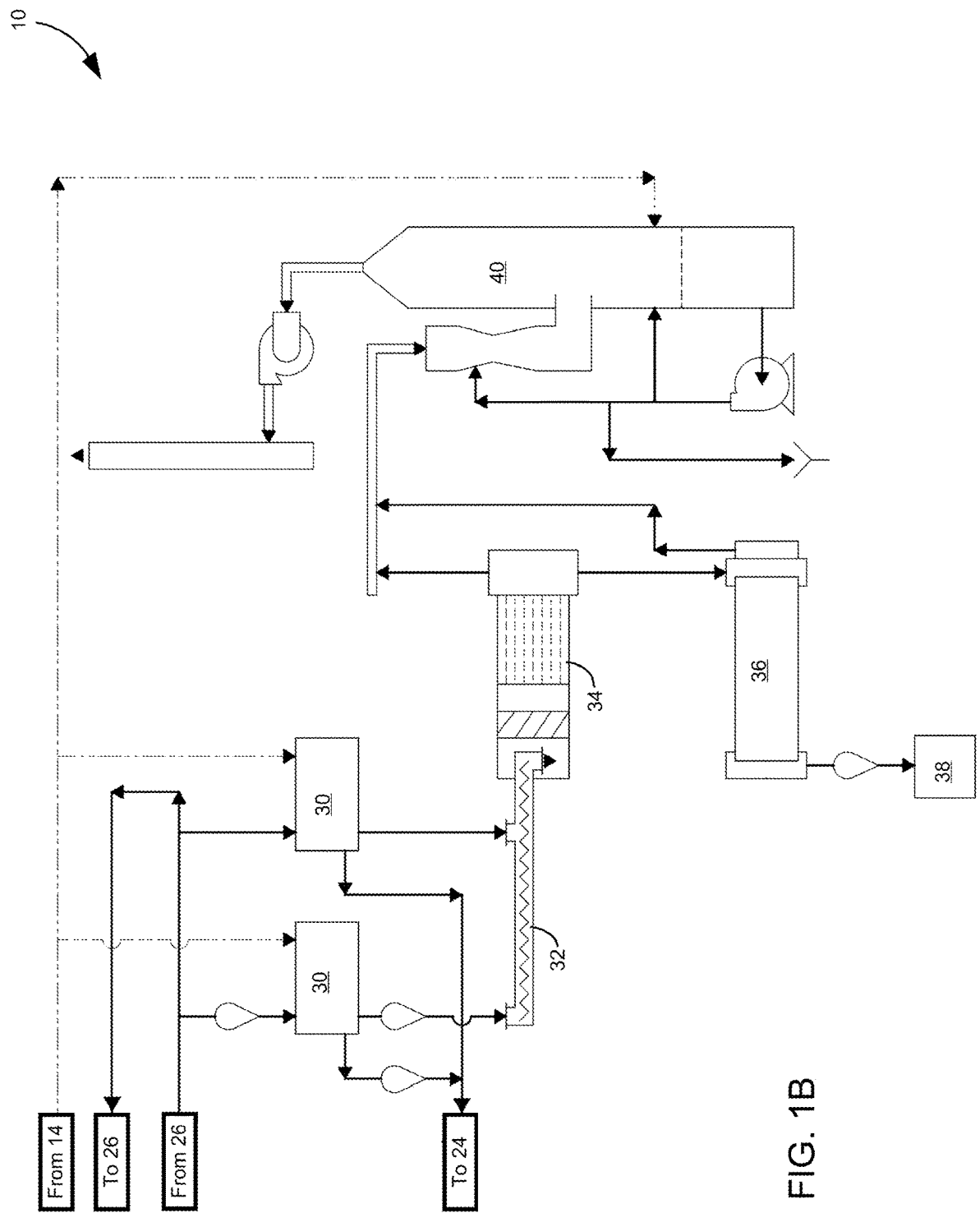

As a particular nonlimiting example, the above noted process can be used to recover lead metal from expired lead batteries as part of a recycling process. FIGS. 1A and 1B schematically represent a system 10 suitable for recovering lead from expired lead batteries according to the above noted process. Although this system is described in reference to recovering lead from a lead paste, it is within the scope of the invention that such a system could be used to recover other metals from other sources.

In the nonlimiting example of FIGS. 1A and 1B in which expired lead batteries are recycled, the operator of a recycling facility delivers a lead paste 12 and water 14 to one or more reaction tanks 18 to which potassium carbonate 16 is added. The lead paste 12 may be an industrial waste material that includes or consists entirely of lead sulfate ($PbSO_4$) as a metal sulfate. Spent electrolyte (sulfuric acid; $H_2SO_4$) from expired lead batteries may optionally be added to the reaction tank 18 to react one or more metals in the waste material to form metal sulfates. The resulting mixture within the reaction tank 18 is represented as being agitated as the lead paste 12 and potassium carbonate 16 react to form a desulfurized lead paste ($PbCO_3$) that can be separated in a filter unit 20 and placed in storage as a metal carbonate byproduct 22 of the process. A reclamation process may be performed on the metal carbonate byproduct 22 to isolate or extract one or more metals (e.g., lead metal) therefrom. Another byproduct of the reaction within the reaction tank 18 is potassium sulfate, which after separation of the desulfurized lead paste in the filter unit 20 is in the form of an aqueous potassium sulfate liquor that is transferred to a filtrate tank 24 where the potassium sulfate liquor is continuously agitated and, optionally, combined with additional potassium carbonate 16 and/or electrolyte 17 from expired lead batteries (sulfuric acid) to more fully complete the conversion of the lead paste to potassium sulfate.

The resulting potassium sulfate liquor is pumped from the filtrate tank 24 to a crystallizer system 26, where water is removed to form a slurry containing potassium sulfate crystals. Thereafter, the water removed by the crystallizer system 26 can be delivered to a condenser 28 and collected for later use, whereas the slurry containing potassium sulfate crystals is pumped to one or more centrifuges 30 (FIG. 1B) where additional water can be removed before the crystals are placed on a conveyor 32 for subsequent drying in a dryer 34. As indicated in FIG. 1B, the water removed from the crystals can be recycled to the filtrate tank 24 and any excess slurry can be recycled back to the crystallizer system 26. The dry potassium sulfate crystals are then conveyed to a cooling drum 36, from which the dry potassium sulfate crystals can be collected as a potassium sulfate product 38 while finer contaminants can be subsequently scrubbed from the resulting effluent in a scrubber 40.

While the invention has been described in terms of a specific embodiment, it should be apparent that alternatives could be adopted by one skilled in the art. For example, the system and its components could differ in appearance and construction from the embodiment described herein and shown in the drawings, functions of certain components of the system could be performed by components of different construction but capable of a similar (though not necessarily equivalent) function, and various other industrial waste materials that contain a metal sulfate or could be reacted with sulfuric acid to contain a metal sulfate could serve as the feedstock. Accordingly, it should be understood that the invention is not necessarily limited to any embodiment described herein or illustrated in the drawings. It should also be understood that the phraseology and terminology employed above are for the purpose of describing the disclosed embodiments, and do not necessarily serve as limitations to the scope of the invention. Therefore, the scope of the invention is to be limited only by the following claims.

The invention claimed is:
1. A method of producing potassium sulfate, the method comprising:
   providing an industrial waste material that includes at least one metal sulfate or a metal product that has been reacted with sulfuric acid to produce at least one metal sulfate;
   reacting the metal sulfate with potassium carbonate to produce a byproduct comprising potassium sulfate;
   separating and/or filtering the byproduct to remove metal carbonates therefrom and produce a filtered liquor; and
   refining the filtered liquor to produce solid potassium sulfate via a crystallization process.

2. The method of claim 1, further comprising performing a reclamation process on the metal carbonates to isolate a metal thereof.

3. The method of claim 1, wherein the metal sulfate comprises lead sulfate.

4. The method of claim 3, wherein the lead sulfate is a constituent of a lead paste obtained from lead batteries.

5. The method of claim 1, wherein the industrial waste material contains the metal sulfate.

6. The method of claim 1, further comprising reacting the industrial waste material with sulfuric acid to produce the metal sulfate.

7. The method of claim 1, wherein the industrial waste material is from a source chosen from the group consisting of metal refinery waste processing, mine drainage, ore processing, copper refining, and a lead recovery operation.

8. A system for producing potassium sulfate, the system comprising:
- an industrial waste material that includes at least one metal sulfate or a metal product that has been reacted with sulfuric acid to produce at least one metal sulfate;
- a source of potassium carbonate;
- a reaction tank adapted to react the metal sulfate with the potassium carbonate to produce potassium sulfate;
- a filter unit for separating a metal carbonate byproduct from the potassium sulfate to yield an aqueous potassium sulfate liquor;
- a crystallizer system adapted to remove water from the aqueous potassium sulfate liquor and form a slurry containing potassium sulfate crystals; and
- one or more units for condensing and drying the potassium sulfate crystals to yield a potassium sulfate product.

* * * * *